United States Patent [19]

Shen et al.

[11] Patent Number: 5,596,746
[45] Date of Patent: Jan. 21, 1997

[54] METHOD FOR TRANSFORMING RELATIONAL DATA BASE SCHEMAS INTO OBJECT MODELS USING IDEAL TABLE META MODELS

[75] Inventors: Hwa N. Shen; William J. Premerlani, both of Scotia; Michael R. Blaha, Niskayuna, all of N.Y.

[73] Assignee: General Electric Company, Schenectady, N.Y.

[21] Appl. No.: 329,805

[22] Filed: Oct. 26, 1994

Related U.S. Application Data

[63] Continuation of Ser. No. 779,772, Oct. 21, 1991, abandoned.
[51] Int. Cl.$^6$ .............................. G06F 7/00; G06F 17/30
[52] U.S. Cl. .................. 395/612; 395/500; 364/283.4; 364/282.1
[58] Field of Search ..................... 395/500, 600

[56] References Cited

U.S. PATENT DOCUMENTS

| | | | |
|---|---|---|---|
| 5,019,961 | 5/1991 | Addesso et al. | 364/192 |
| 5,133,075 | 7/1992 | Risch | 395/800 |
| 5,201,046 | 4/1993 | Goldberg et al. | 395/600 |
| 5,295,256 | 3/1994 | Bapat | 395/500 |

OTHER PUBLICATIONS

Loomis et al; "An Object Modeling Technique for Conceptual Design"; Proceedings of European Conference on Object–Oriented Programming, Paris Jun. 1987.

Rumbaugh, "Relations as Semantic Constructs in an Object-Oriented Language", OOPSLA '87 Proceedings, Orlando, Oct., 1987, pp. 1–16.

Barsala, Thierry "View Objects for Relational Databases" Mar. 1990, Stanford University.

Wiederhold, G. "Views Objects and Databases" 1986 pp. 37–39.

Law et al "Managing Objects in a Sharable Relational Framework" 1990.

Blaha, M. R. "An Extensible AE&C Dababase Model" Computers Chem Eng. 1989.

*Primary Examiner*—Krisna Lim
*Attorney, Agent, or Firm*—David C. Goldman; Marvin Snyder

[57] ABSTRACT

An algorithm for transforming data base schema information to object modeling notation utilizes meta models of the data base tables and the target object modeling notation respectively to bridge the gap between the data base schema representation and the object model representation. Detection of associations between classes of objects is performed for one-to-one, one-to-many, and many-to-many associations by analyzing unique key attributes. Once an object meta model is populated, the underlying object model may be displayed using existing software packages.

12 Claims, 9 Drawing Sheets

MODEL
200

POPULATED MODEL
202

META MODEL
204

POPULATED META MODEL
206

METHOD FOR TRANSFORMING RELATIONAL DATA BASE SCHEMAS INTO OBJECT MODELS USING IDEAL TABLE META MODELS

This application is a continuation of application Ser. No. 07/779,772 filed Oct. 21, 1991 now abandoned.

This invention relates generally to object-oriented modeling and design and more specifically to a method for transforming data base schemas to object models.

BACKGROUND OF THE INVENTION

Object oriented modeling has proven to be a useful and practical methodology in the design of data base applications. Because of its high level of abstraction, it allows the user to gain a deep insight within an application by concentrating on objects and relationships, rather than on the data base implementation. If an object oriented paradigm is incorporated in the Data Base Management System (DBMS) design process, the resulting DBMS is more robust, tracks integrity better, and is better documented. Once an object model is defined, a series of transformations can be performed to arrive at the data base schema.

Commonly assigned copending U.S. patent application Ser. No. 07/518,396 entitled "Object Diagram Compiler", filed May 8, 1990 now abandoned, describes a method for transforming object diagrams, which may be drawn by a system user on a graphics editor, into output commands in a structured query language (SQL) which can be used to load a data dictionary with schema information. Section I and Section II of the above-identified application provide a background for understanding object modeling and relational data bases respectively and are incorporated herein by reference. There is a need to reverse the process just described, i.e., start with an existing data base schema and arrive at an object model. This is important for several reasons. For existing data base applications, it would be useful to take advantage of object oriented paradigm. By performing the transformation from an existing data base schema to an object model, future modifications and enhancements to the data base design can be carried out on the object model. An object model of a data base allows one to gain a deeper understanding of the data base design by focusing on a high level construct of objects and their relationships, without the distraction of data base implementation details. Object models further ensure better data base integrity by identifying dangling pointers and duplicate references. This is especially important as an existing data base is modified and expanded. Finally, because object diagrams capture the application and problem at a high level, it is easier to detect inconsistencies between the application developer and the application user. Documentation and communication is thereby improved.

SUMMARY OF THE INVENTION

In accordance with the present invention for practice on a computer, there is provided a method and apparatus for transforming data base schemas to object models. The transformation is achieved in three distinct steps. First, the data base schema is mapped into instances in an ideal table meta model. Next, the information in the ideal table meta model is mapped into instances in an object meta model. Finally, the information in the object meta model is used to generate a file compatible with an object modeling tool for the purpose of displaying, in graphical form, the object model on a visual display device of a computer.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

DESCRIPTION OF THE INVENTION

In describing the invention, the basic concept is first described and then illustrated by a simple example. It is assumed that the existing data base schema information and the data are available in the data dictionary tables of the implemented Relational Data Base Management System (RDBMS) platform. Thus, the starting point is the schema information for all the tables, columns, etc. for an existing data base.

Figure 1:
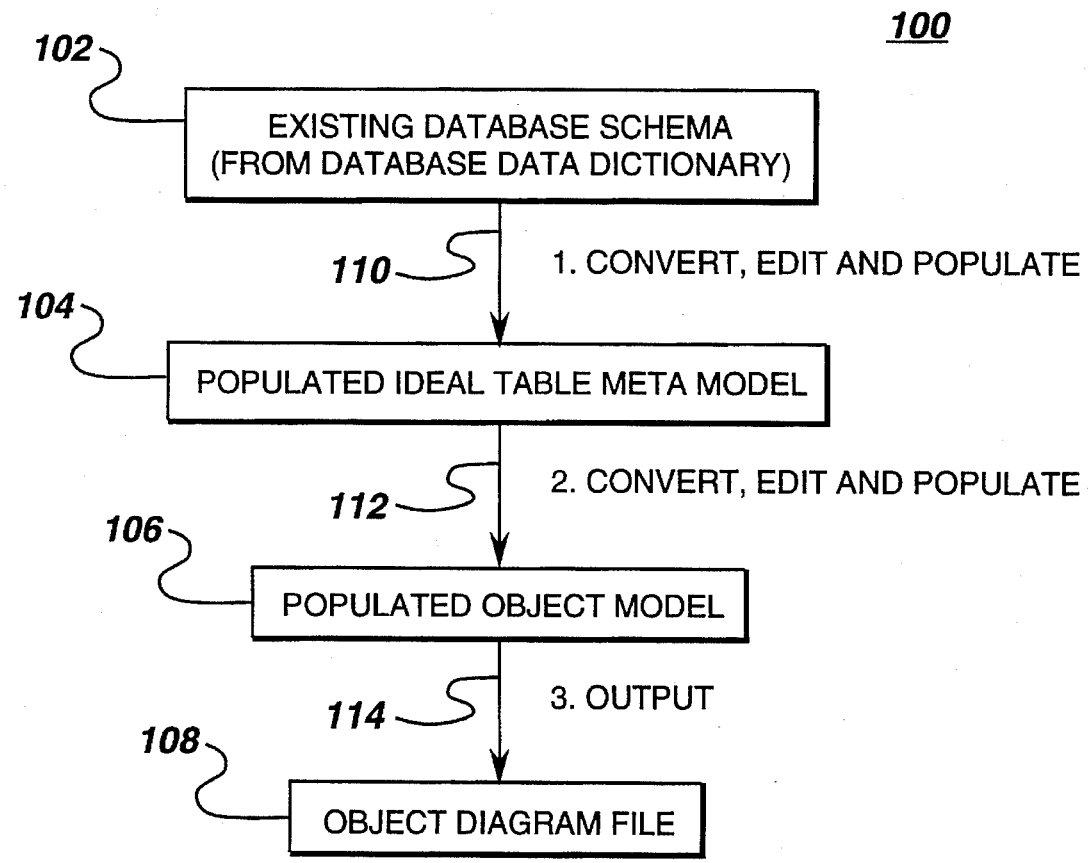
FIG. 1 is a flowchart representation of the method of the present invention.

FIG. 1 gives the overall processing flow. Each of the processing steps is explained in more detail later. Conceptually, the transformation is achieved in three distinct steps. The first step, 110, is to map the data base schema 102 into instances in an ideal table meta model 104. The ideal table meta model is thereby said to be "populated". Meta models are object models that describe an underlying model, which also may be an object model. The data base table and column information becomes data in the ideal table meta model. The next step, 112, is to map the information in the ideal table meta model into instances in an object meta model 106, similarly referred to as being "populated". Finally, the data in the object meta model is used to generate a file 108 compatible with the underlying object modeling tool, which, when supplied with the file, is capable of displaying graphically the object model diagram. The file 108, is an ASCII description of the object model diagram. Once the file is generated, the full capabilities of the object modeling tool can be used to track the object model.

The data in the ideal table meta model and object meta model can be stored in a relational data base for easy access. Once the transformation has been completed, future modifications to the object model can be re-transformed into a data base schema, by repeating the steps in FIG. 1 in reverse. Because some of the transformation is non-unique, interaction with the user is needed to capture precise meaning. For example, if a column in a table is a foreign key to a different table, the transformed object model can represent the foreign key as an association between two classes, corresponding to the two tables. However, the multiplicity of the association on the class where the foreign key is buried can not be completely inferred. It may be one, many or some other multiplicity.

Figure 2A:
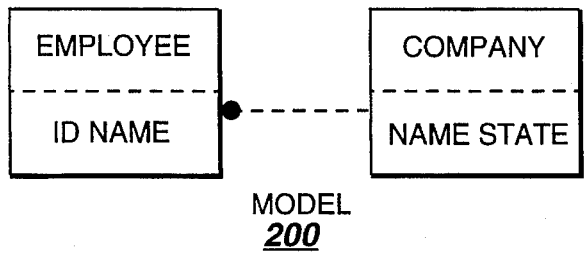
FIG. 2a, 2b, 2c and 2d illustrate the concept of a populated mode 1.
Figure 2B:
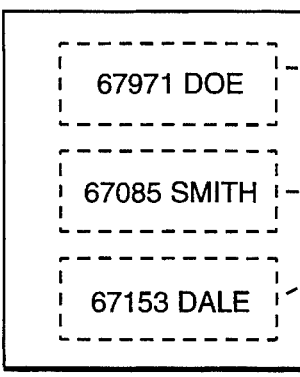
Figure 2B:
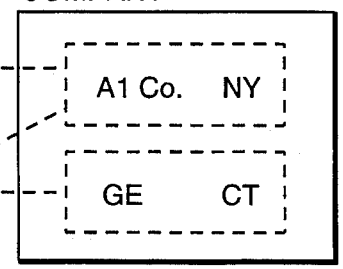
Figure 2C:
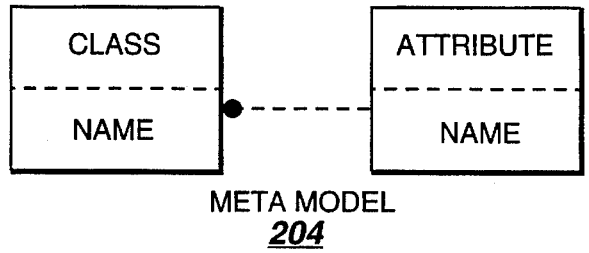
Figure 2D:
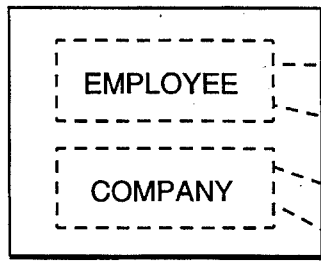
Figure 2D:
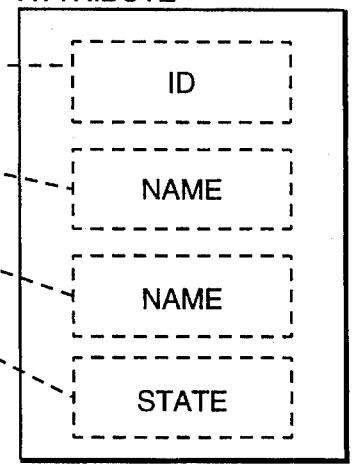

In FIG. 2(a) there is shown a simple object model 200 which has classes, company and employee, and attributes, ID and name for employee, and name and state for company. In FIG. 2(b), a populated model 202 is simply a model which contains data. In FIG. 2(c) meta model 204 is shown to illustrate the concept of a meta model. Using object modeling notation, the meta model 204 shows that the underlying object model is composed of classes which have many attributes associated with them. Classes and attributes have attributes called name. Similarly, in FIG. 2(d) a populated meta model 206 is a meta model with data. In both of these populated models, a specific occurrence of the general model is referred to as an instance. For example, the class employee, in populated meta model 206, plus the associations to id and name, constitutes an instance of the meta model 204.

Referring again to FIG. 1, step 110 reads the information from the data dictionary and populates an ideal table meta model. Since the present inventive method relies heavily on the use of meta models, each one will be explained in detail below.

Figure 3:
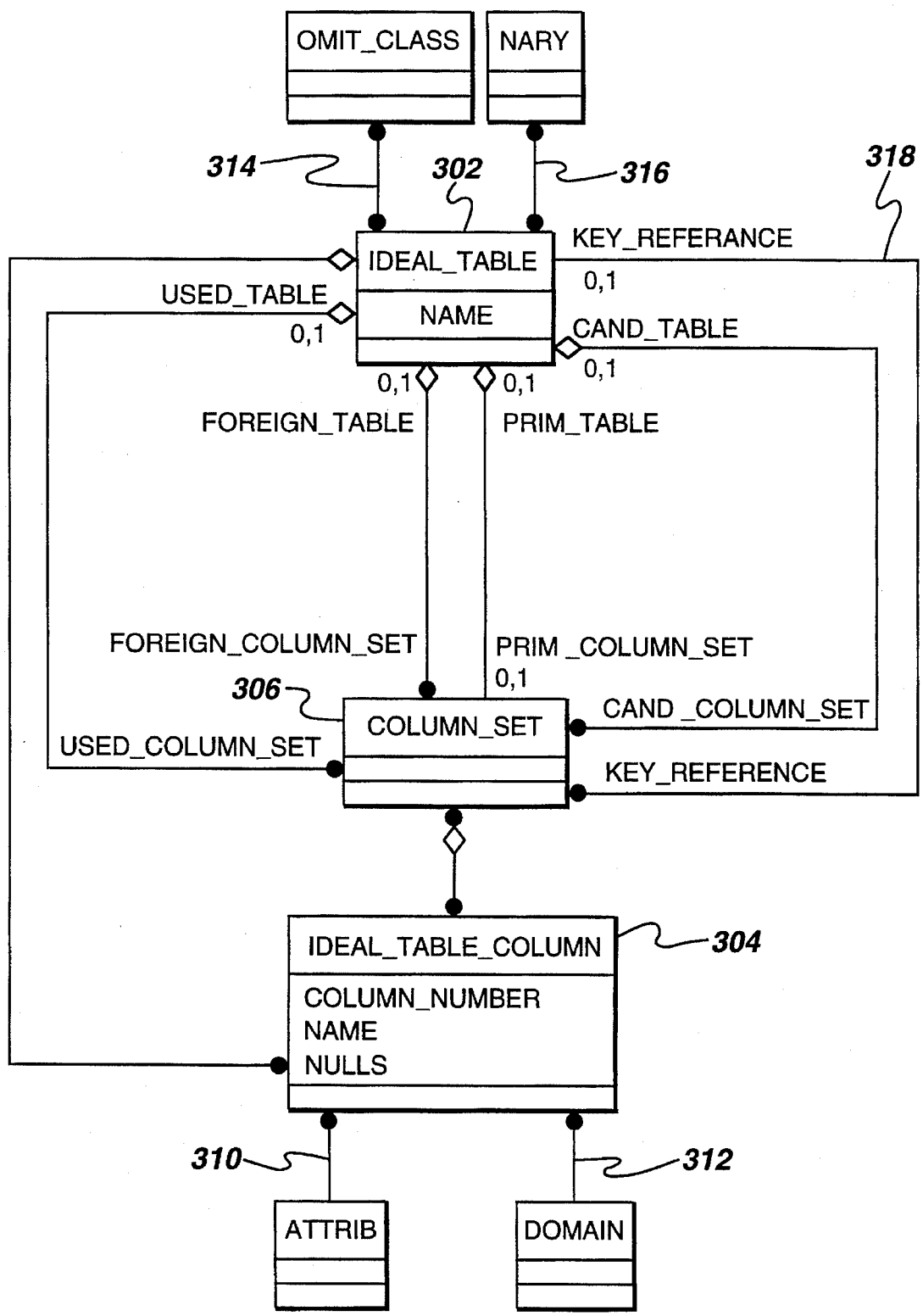
FIG. 3 illustrates an ideal table meta model as used in accordance with the present invention.

FIG. 3 describes the table meta model. Ideal-tables 302 are composed of many ideal-table-columns 304. A column-set 306 is composed of many ideal-table-columns 304, which define the primary and candidate keys. Primary and candidate keys are minimal combinations of attributes which identify one and only one class instance. Column-sets 306 can also define table-columns 304 that are used to index the tuples in the table for faster access. The four relationships 310, 312, 314, and 316 provide the link between the object model and the table model.

Rules for populating the ideal table meta model are as follows:

1. Tables in the data dictionary map to ideal tables. Table columns map to ideal table columns. Primary key, if not available from the data dictionary, is either inferred through common column names or inputted by the user.

2. Columns that are members of indices in the data base schema are grouped together into column sets and referenced to the appropriate ideal table.

3. Tables that share common columns are linked by the key-referent-key-reference association 318 in FIG. 3. This association is used in establishing the relationships between objects in the object model.

Figure 4A:
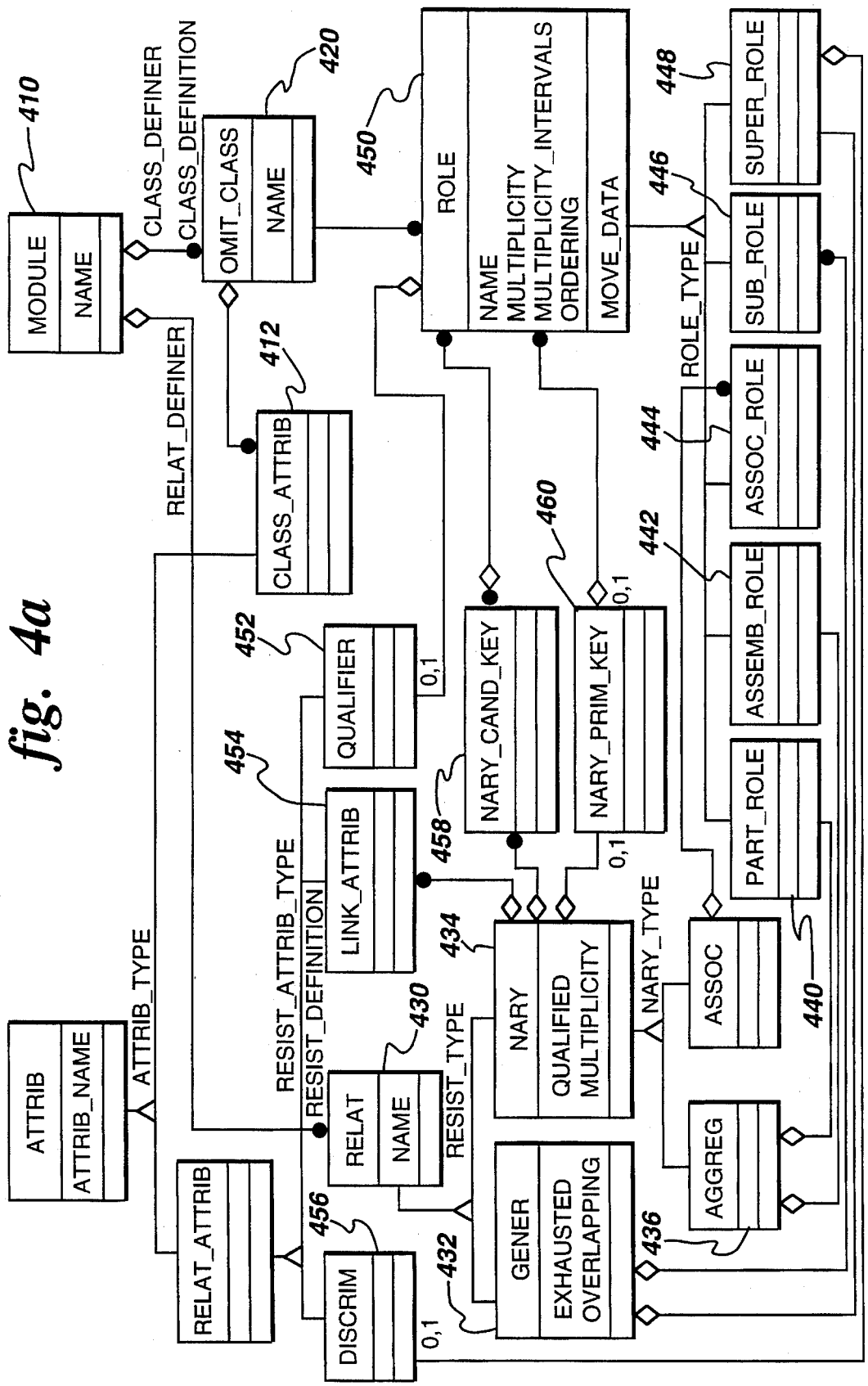
FIGS. 4a and 4b illustrate an object diagram meta model as used in accordance with the present invention.
Figure 4B:
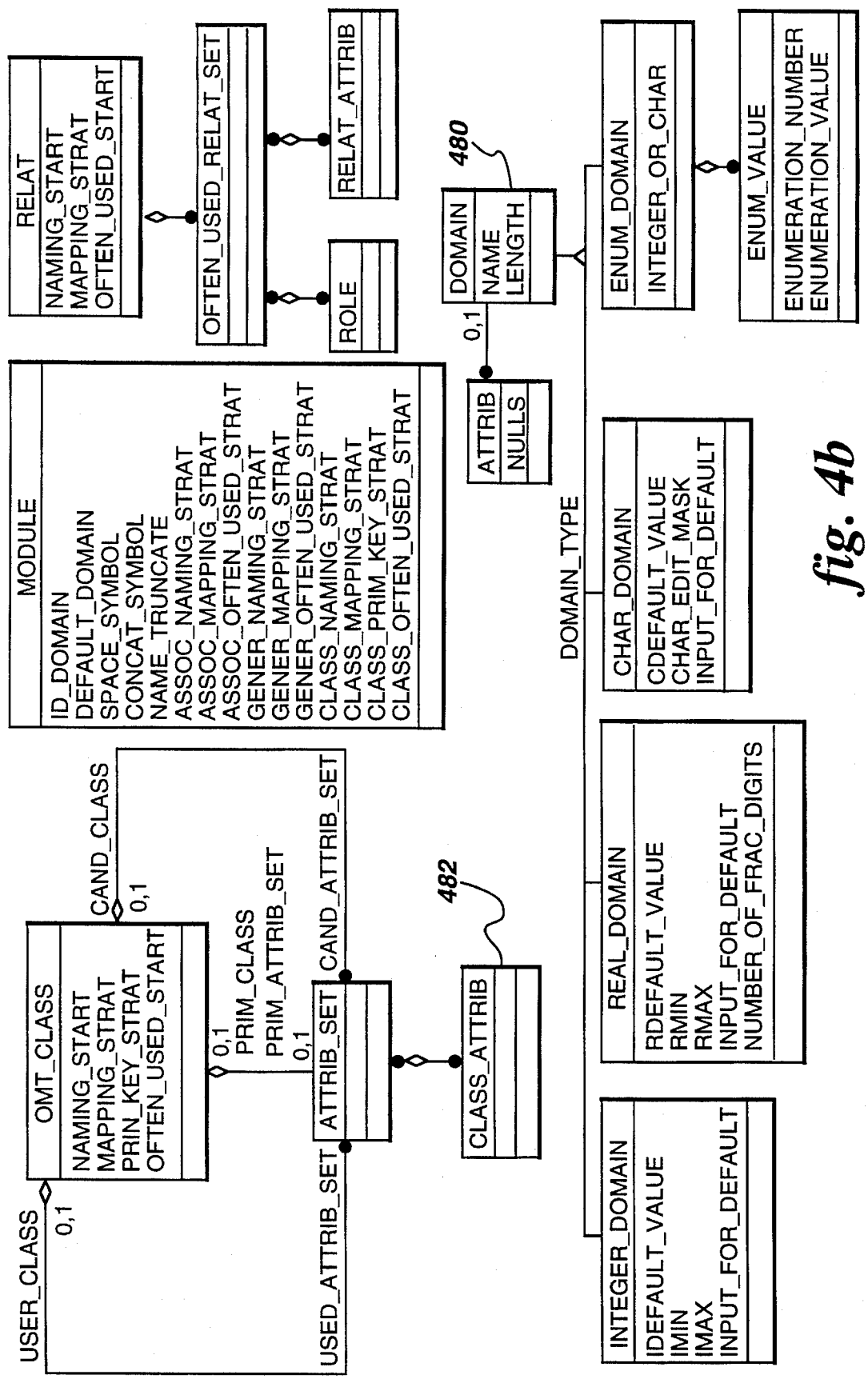

Once the ideal table meta model has been populated, the next step 112 in FIG. 1 is to take the information in the ideal table meta model and populate an object meta model 106. FIGS. 4a and 4b show an object meta model. A module 410 is composed of classes 420 and relationships 430.

The line with the diamond denotes an aggregation and the solid ball denotes a "many" type multiplicity of the aggregation. Classes 420 are made up of class-attrib 412 (short for class attributes). Each relat 430 may be classified as a gener 432 (short for generalization) or a nary 434 relationship (a generalized relationship with n members), using the triangular superclass/subclass generalization relationship notation. Nary relationships 434 are further classified into aggreg 436 (short for aggregation) or assoc 438 (short for association) relationships. Each relationship has its own roles: part-role 440 and assemb-role 442 for aggregations; assoc-role 444 for associations; sub-role 446 and super-role 448 for generalizations. Each class 420 may have many roles 450, and each role may have zero or one qualifier 452. Many link-attrib 454 (short for link attributes) may be associated with nary relationships 434. Each nary 434 has zero or one nary-prim-keys 460 (short for primary key) and zero or many nary-cand-keys 458 (short for candidate key). FIG. 4b continues the object meta model by defining the domain 480 of the attributes and sets of class-attrib 482 that characterize the primary key and candidate keys. The used attribute sets define those attributes, both for class and relat, that are frequently accessed.

There can be a series of mappings for transforming the data in the ideal table meta model to data in the object meta model. Using information from the ideal table meta model, an intermediate object model can be generated, which is characterized by a set of more complex rules than the first mapping step. These rules are as follows:

1. Tables which have a key-reference-key-referent link are mapped as classes with a buried foreign key.

2. Columns in tables are mapped to class attributes in the class corresponding to the ideal table. Multiplicity of buried associations can only be partially ascertained, and the user must refine the object model transformed from the ideal table meta model.

3. Generalizations, aggregations, and associations are different types of relationships and their usage is dependent on the user's intention and the application. Thus, additional editing and user intervention are required to capture the relationships intended by the user.

From the intermediate object model, additional transformations may be taken. For example, classes, which have all of their attributes as buried foreign keys can be replaced by an association. To complete the transformation process, the information in the object meta model is extracted and stored as shown in step 114 of FIG. 1, in a format compatible with a graphics editor.

Figure 5:
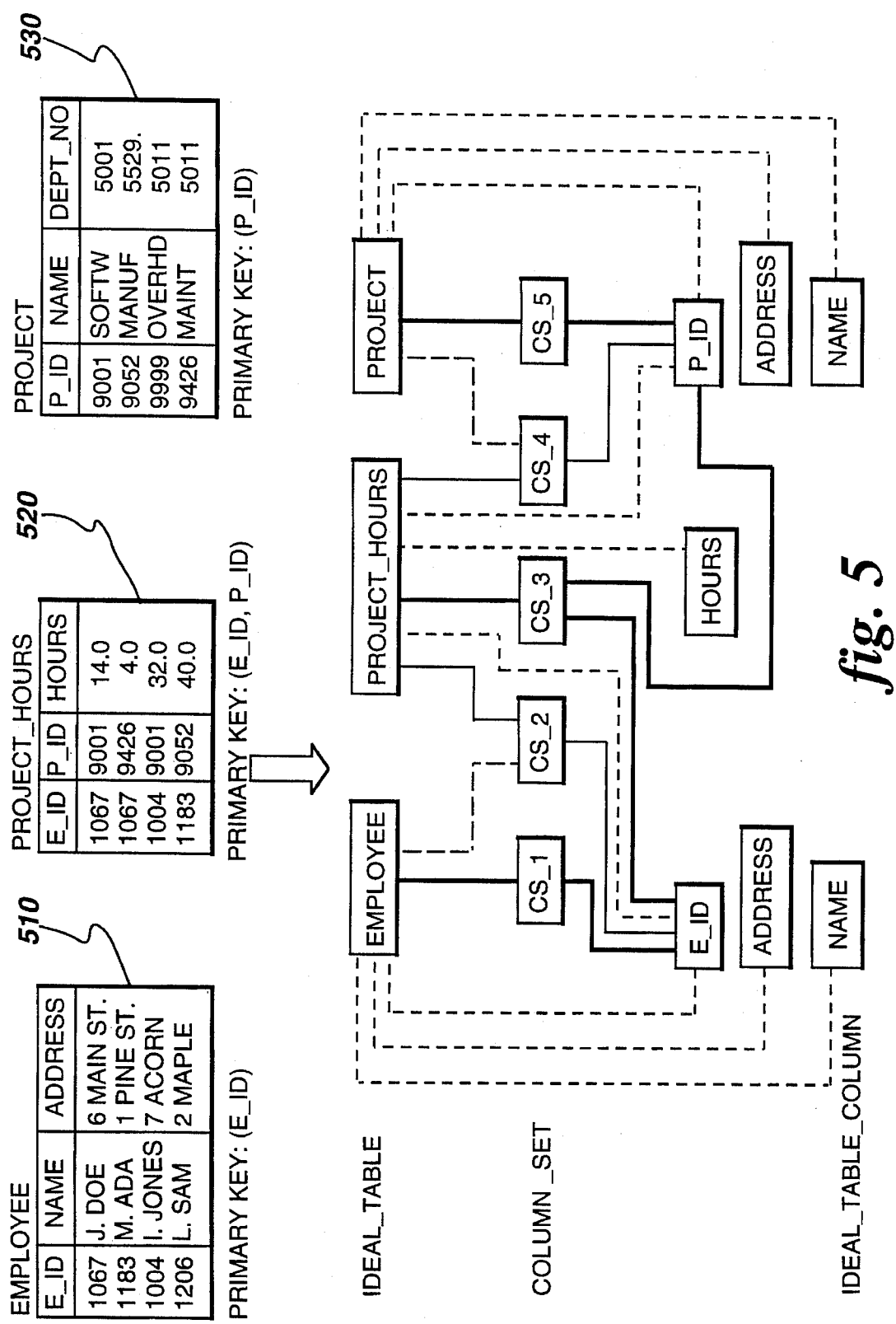
FIGS. 5, 6a, 6b, 7a, and 7b illustrate an exemplary reverse transformation with three tables containing three columns each.

The transformation process will now be illustrated by the example shown in FIGS. 5, 6, and 7. The schemas for EMPLOYEE 510, PROJECT 530, and PROJECT-HOURS 520 tables are shown on the top of FIG. 5, with a partial list of the tuples that populate the three tables. The PROJECT table 530 contains information about various projects; the EMPLOYEE table 510 gives employee information; and the PROJECT-HOURS table 520 tracks the various hours that employees spend on a project. The table and columns are obtained by queries against the data dictionary. While this is an extremely simple example, it illustrates the idea behind the present invention.

Figure 6A:
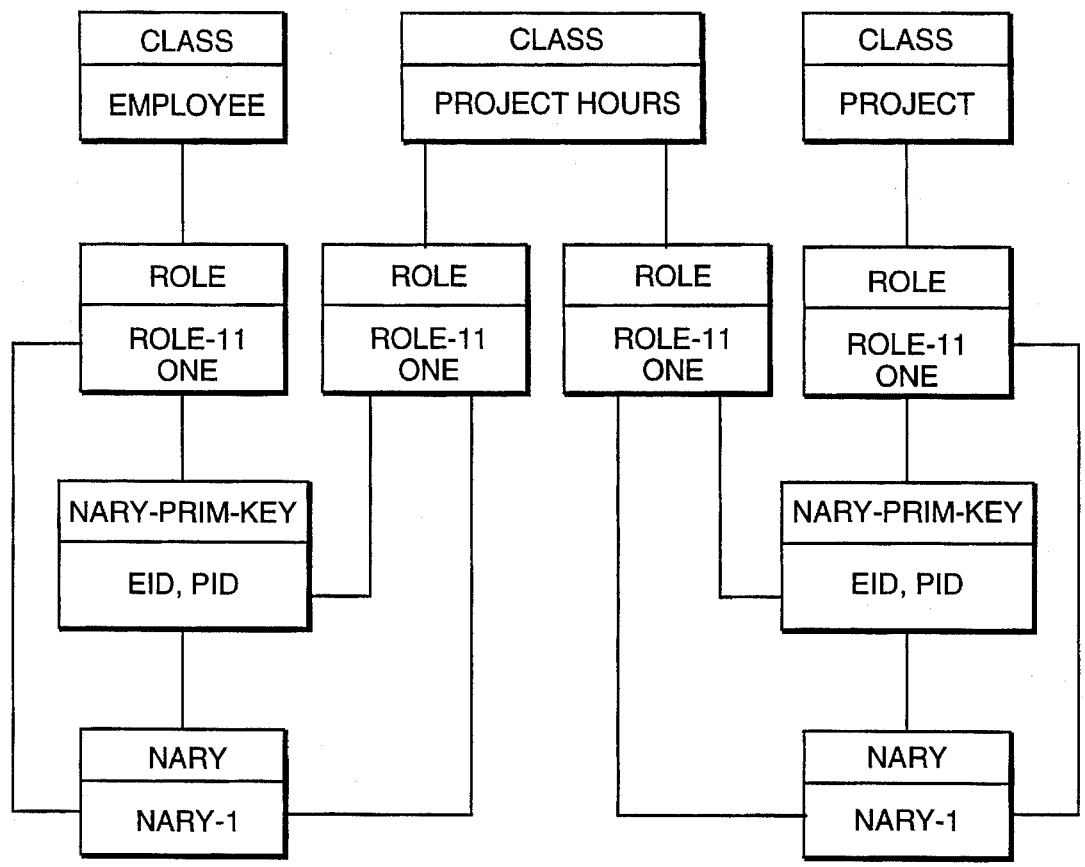
Figure 6B:
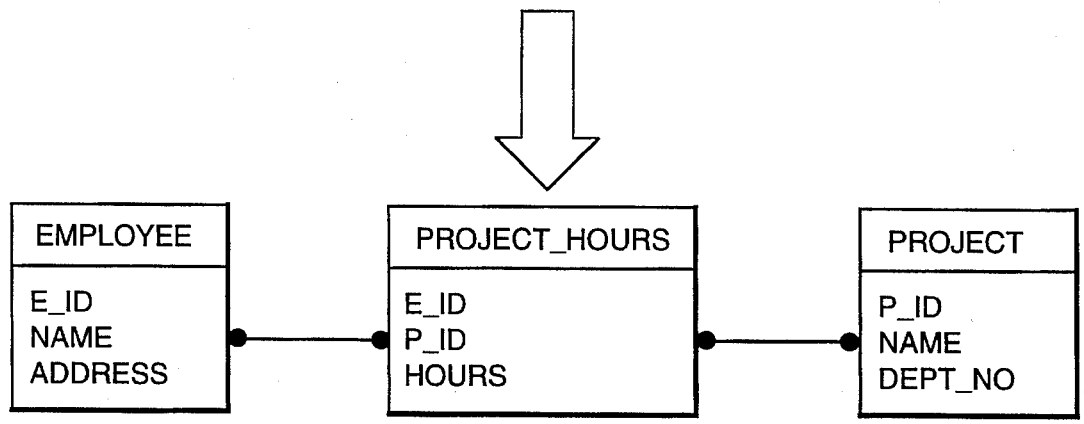

The first step is to transform the data dictionary information into data in the ideal table meta model. This is shown in the lower part of FIG. 5. The classes of the ideal table meta model are labelled on the left side. Data base tables are mapped to ideal-table instances. Data base columns are mapped to ideal-table column instances. The ideal table instances are connected to ideal-table-columns through the column-sets (CS-1 through CS-5) and also by direct connection. The heavy solid lines denote the primary key links from ideal tables to column set and column set to ideal-table-columns; the light solid lines denote the foreign key links; the dashed lines denote the direct links between ideal-table-columns and ideal-tables and the dotted lines denote key-reference links from column-sets which denote a foreign key to ideal tables which have that foreign key as a primary key. The second step in the transformation process is to take the information in the ideal table meta model and produce a populated object meta model, or a series of intermediate object meta models. This is shown in FIG. 6a (some object classes have been omitted for clarity). One possible intermediate populated object meta model 600 is shown, where the tables are mapped to classes and foreign keys are mapped to associations for the PROJECT-HOURS class. The multiplicities of the associations on the PROJECT-HOURS class are arbitrarily assigned to be "many". FIG. 6b shows the object diagram represented by the populated meta model of FIG. 6a.

Figure 7A:
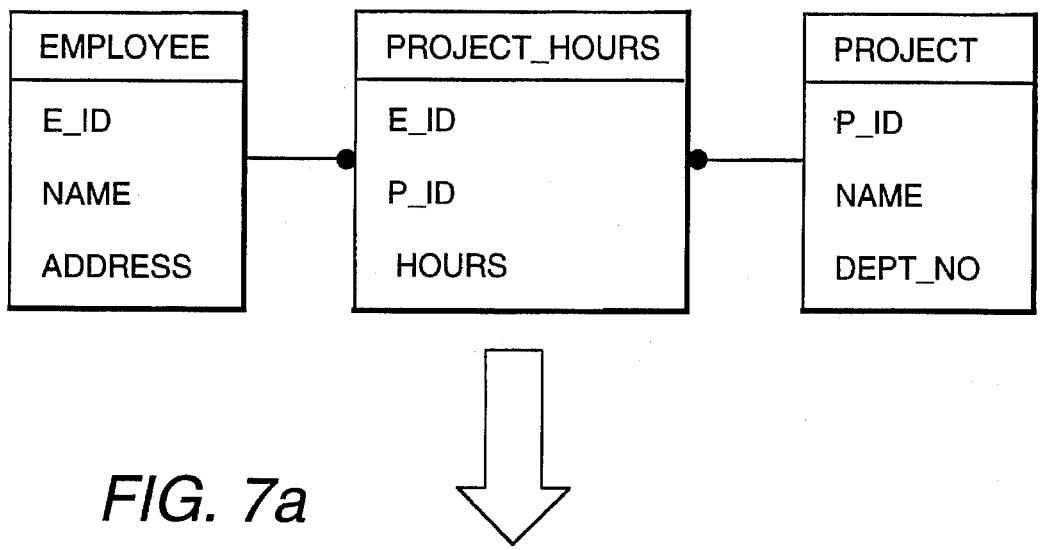
Figure 7B:
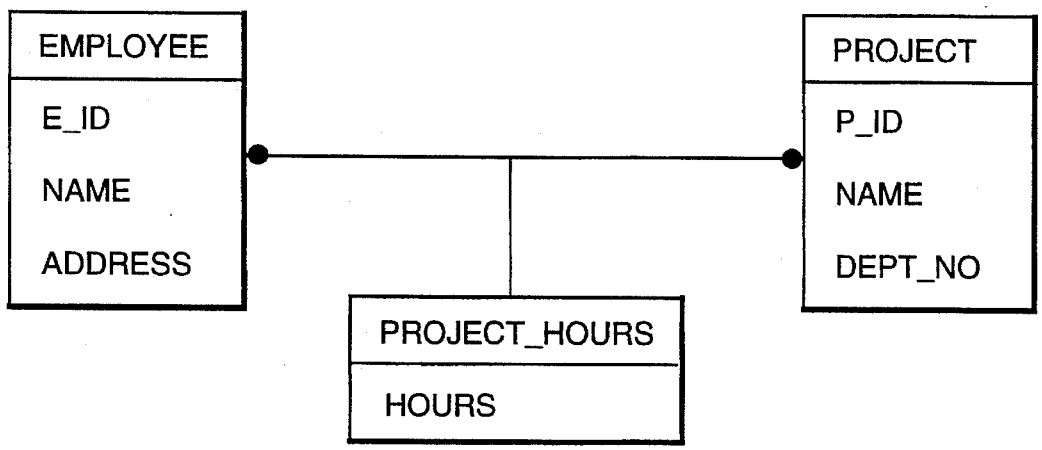
Figure 8:
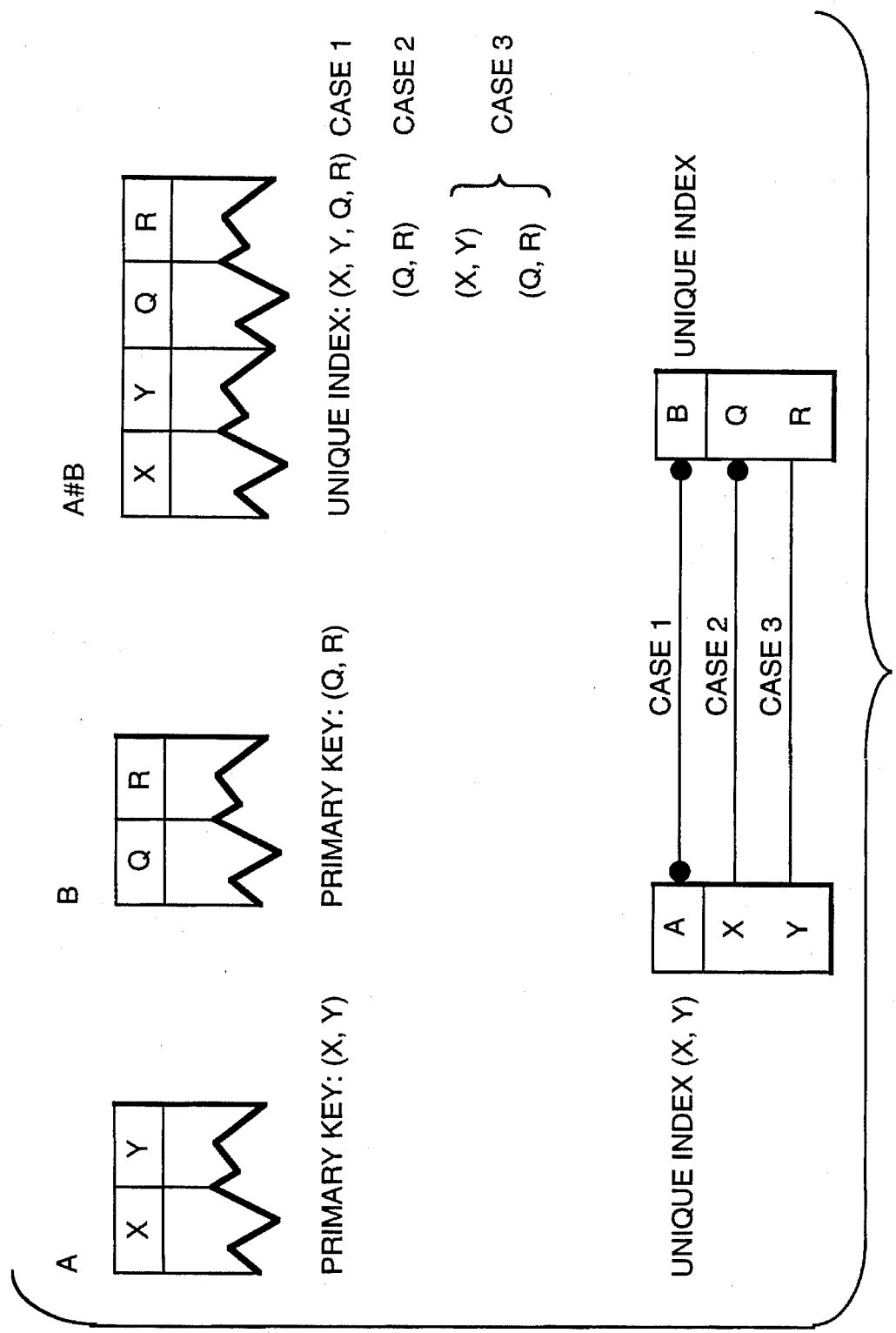
FIG. 8 shows three types of associations derived from a data base according to the present invention.

A second transformation, based on user interaction, is shown in FIG. 7a, where the multiplicity is reduced to one. The final transformation shown in FIG. 7b eliminated the PROJECT-HOURS class, and replaced the class by a direct association link between the EMPLOYEE class and the PROJECT class, as well as adding a link attribute of HOURS to the association. It should be noted that in many cases, classes may be eliminated in this manner because the tables from which they have been mapped represent associations between classes. There are three possible cases: many-to-many associations, one-to-many associations, and one-to-one associations. These three cases are illustrated in FIG. 8, where tables A, B, and A#B are shown. Table A#B gives the linkage between tables A and B. The unique indices (the term unique index is used interchangeably with primary key herein) on table A#B for the three types of associations are also shown.

To detect a possible many-to-many association, primary key attributes are searched to see if they can be partitioned into mutually exclusive primary key attributes of other classes. In FIG. 8, Case 1, primary key (X, Y, Q, R) can be partitioned into primary key (X, Y) for table A, and (Q, R) for table B. Classes satisfying this condition are transformed into associations. The actual multiplicity of the roles can be something less than many but in order for a many-to-many association to be present, the above conditions are necessary. Non-primary key attributes are treated as link attributes.

To detect one-to-many associations, primary key attributes are examined to see if they are primary key attributes of other classes. Subsets of non-primary key attributes are checked to see if any subset is the primary key of another class. In FIG. 8, Case 2, primary key (Q, R) in table A#B is the primary key for table B, and the non-primary key attributes (X, Y) is the primary key for table A. Again, the actual multiplicity may be something less than many but the above conditions (for many-to-many or one-to-many) are necessary for a one-to-many association. Attributes that are not in the primary keys of the classes attached to the associations are treated as link attributes.

To detect one-to-one associations, aside from those resulting from re-evaluating either a many-to-many or one-to-many association as described above, classes which contain more than one unique index are examined to determine whether each index is a primary key to other classes (FIG. 8, Case 3). Attributes that are not part of the unique indices are treated as link attributes.

While the present invention has been described with respect to specific embodiments, many modifications, variations, alterations, substitutions, and equivalents will be apparent to those skilled in the art. Accordingly, the invention is to be considered as limited only by the spirit and scope of the appended claims.

What is claimed is:

1. A computer-implemented method for transforming a data base schema of a relational data base into an object model representative of said data base schema, the object model showing various objects within the data schema and their data attributes, operations, and relationships between each object in the data schema, said method comprising the steps of:

constructing an ideal table meta model of said data base schema;

populating said ideal table meta model with data extracted from said data base schema;

constructing an object diagram meta model of said data base schema from said ideal table meta model;

populating said object diagram meta model with data extracted from said ideal table meta model; and transforming said object diagram meta model into said object model representative of said data base schema, the object model showing various objects within the data schema and their data attributes, operations, and relationships between each object in the data schema, said transforming including the step of transforming said object diagram meta model into a series of successive, intermediate, populated object diagram meta models describing the object model, wherein said step of transforming said object diagram meta model into said series of successive, intermediate, populated object diagram meta models comprises the steps of determining the multiplicity of associations on classes mapped from tables with foreign keys; converting classes mapped from tables whose primary keys can be partitioned into mutually exclusive primary key attributes of other classes, to many-to-many associations; converting classes mapped from tables whose primary keys are primary keys of other classes and whose non-primary key attributes include primary keys of other classes, to one-to-many associations; converting classes mapped from tables having multiple primary keys and wherein each said primary key is a primary key of another class, to one-to-one associations; and determining the actual multiplicity of said one-to-many and many-to-many associations.

2. The computer-implemented method of claim 1 further comprising the step of:

outputting a file from said object model, said file being effective as input to an object modeling tool.

3. The computer-implemented method of claim 2 wherein said step of populating said ideal table meta model comprises the steps of:

a) mapping tables from said data base schema to ideal tables in said ideal table meta model; and b) mapping table columns from said data base schema to ideal table columns in said ideal table meta model.

4. The computer-implemented method of claim 2, wherein said step of populating said object diagram meta model comprises the steps of:

mapping ideal tables to classes in said object diagram meta model;

mapping ideal tables having a foreign key and ideal tables having a primary key equivalent to said foreign key as an association with an nary primary key equal to the primary key of the ideal table containing said foreign key; and mapping ideal table columns to class attributes.

5. The computer-implemented method of claim 1 wherein said step of populating said ideal table meta model comprises the steps of:

a) mapping tables from said data base schema to ideal tables in said ideal table meta model; and b) mapping table columns from said data base schema to ideal table columns in said ideal table meta model.

6. The computer-implemented method of claim 1, wherein said step of populating said object diagram meta model comprises the steps of:

mapping ideal tables to classes in said object diagram meta model;

mapping ideal tables having a foreign key and ideal tables having a primary key equivalent to said foreign key as an association with an nary primary key equal to the primary key of the ideal table containing said foreign key; and mapping ideal table columns to class attributes.

7. A computer system for transforming a data base schema of a relational data base into an object model representative of said data base schema, the object model showing various objects within the data schema and their data attributes, operations, and relationships between each object in the data schema, said computer system comprising a means to interact with a user, a visual display means, a data base management system including a data dictionary, and a computer programmed to:

construct an ideal table meta model of said data base schema;

populate said ideal table meta model with data extracted from said data base schema;

construct an object diagram meta model of said data base schema from said ideal table meta model;

populate said object diagram meta model with data extracted from said ideal table meta model; and transform said object diagram meta model into said object model representative of said data base schema, the object model showing various objects within the data schema and their data attributes, operations, and relationships between each object in the data schema, said transform including transforming said object diagram meta model into a series of successive, intermediate, populated object diagram meta models describing the object model, wherein said transformation of said object diagram meta model into said series of successive, intermediate, populated object diagram meta models includes determining the multiplicity of associations on classes mapped from tables with foreign keys; converting classes mapped from tables whose primary keys can be partitioned into mutually exclusive primary key attributes of other classes, to many-to-many associations; converting classes mapped from tables whose primary keys are primary keys of other classes and whose non-primary key attributes include primary keys of other classes, to one-to-many associations; converting classes mapped from tables having multiple primary keys and wherein each said primary key is a primary key of another class, to one-to-one associations; and determining the actual multiplicity of said one-to-many and many-to-many associations.

8. The computer system of claim 7, wherein said programmed computer is further programmed to:

output a file from said object model, said file being effective as input to an object modeling tool.

9. The computer system of claim 8, wherein said computer programmed to populate said object diagram meta model is programmed to:

map ideal tables to classes in said object diagram meta model;

map ideal tables having a foreign key and ideal tables having a primary key equivalent to said foreign key as an association with an nary primary key equal to the primary key of the ideal table containing said foreign key; and map ideal table columns to class attributes.

10. The computer system of claim 8 wherein said computer programmed to populate said ideal table meta model is programmed to:

a) map tables from said data base schema to ideal tables in said ideal table meta model; and b) map table columns from said data base schema to ideal table columns in said ideal table meta model.

11. The computer system of claim 7 wherein said computer programmed to populate said ideal table meta model is programmed to:

a) map tables from said data base schema to ideal tables in said ideal table meta model; and b) map table columns from said data base schema to ideal table columns in said ideal table meta model.

12. The computer system of claim 7, wherein said computer programmed to populate said object diagram meta model is programmed to:

map ideal tables to classes in said object diagram meta model;

map ideal tables having a foreign key and ideal tables having a primary key equivalent to said foreign key as an association with an nary primary key equal to the primary key of the ideal table containing said foreign key; and map ideal table columns to class attributes.

\* \* \* \* \*